United States Patent
Lasson et al.

(10) Patent No.: US 12,401,215 B2
(45) Date of Patent: Aug. 26, 2025

(54) VOLTAGE CONVERSION SYSTEM FOR BATTERY ELECTRIC POWERTRAIN WITH COMMON MINUS-POLE

(71) Applicant: Volvo Car Corporation, Gothenburg (SE)

(72) Inventors: Nils Anders Lasson, Gothenburg (SE); Narendar Rao Gannamaneni, Gothenburg (SE); Lars Johan Henrik Sjöstedt, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 509 days.

(21) Appl. No.: 17/652,052

(22) Filed: Feb. 22, 2022

(65) Prior Publication Data
US 2022/0278541 A1    Sep. 1, 2022

Related U.S. Application Data

(60) Provisional application No. 63/155,036, filed on Mar. 1, 2021.

(51) Int. Cl.
*B60L 53/22* (2019.01)
*B60L 50/60* (2019.01)
(Continued)

(52) U.S. Cl.
CPC ........ *H02J 7/007182* (2020.01); *B60L 50/60* (2019.02); *B60L 53/18* (2019.02);
(Continued)

(58) Field of Classification Search
CPC ... H02J 7/007182; H02J 7/0029; B60L 50/60; B60L 53/18; B60L 53/22; B60L 53/24;
(Continued)

(56) References Cited

U.S. PATENT DOCUMENTS 4,136,382 A * 1/1979 Ricci ................. B60L 50/51
                                                363/128
10,471,837 B2 * 11/2019 Herke ................ B60L 53/14
(Continued)

FOREIGN PATENT DOCUMENTS

CN     109017340 A    12/2018
CN     111791728 A    10/2020
(Continued)

OTHER PUBLICATIONS

Extended European Search Report received for European Patent Application Serial No. 22159437.7 dated Jul. 21, 2022, 10 pages.
(Continued)

*Primary Examiner* — Nghia M Doan
(74) *Attorney, Agent, or Firm* — Amin, Turocy & Watson, LLP

(57) ABSTRACT

An electric vehicle charging system is provided. In some embodiments, the electric vehicle charging system can comprise an electric motor drive system comprising a three-phase electric motor and an inverter. In various embodiments, a negative cable can be connected to an electric vehicle inlet and a battery. In further embodiments, a booster charging cable can be connected to a star-point of the three-phase electric motor and to a positive pole of the electric vehicle inlet, wherein the booster charging cable bypasses a connection between the positive pole and the battery.

20 Claims, 12 Drawing Sheets

(51) Int. Cl.
  *B60L 53/18* (2019.01)
  *H01M 10/44* (2006.01)
  *H01M 10/46* (2006.01)
  *H01M 10/48* (2006.01)
  *H02J 7/00* (2006.01)
  *H02P 27/06* (2006.01)

(52) U.S. Cl.
  CPC ............ *H01M 10/44* (2013.01); *H01M 10/46* (2013.01); *H01M 10/48* (2013.01); *H02J 7/0029* (2013.01); *H02P 27/06* (2013.01); *H01M 2220/20* (2013.01)

(58) Field of Classification Search
  CPC ......... B60L 53/11; B60L 58/12; H01M 10/44; H01M 10/46; H01M 10/48; H01M 2220/20; H02P 27/06; H02M 3/155; H02M 7/537
  See application file for complete search history.

(56) References Cited

U.S. PATENT DOCUMENTS

| | | | |
|---|---|---|---|
| 10,857,898 B2 | 12/2020 | Shin et al. | |
| 2019/0023136 A1* | 1/2019 | Lee | H02J 7/02 |
| 2019/0315234 A1 | 10/2019 | Shin et al. | |
| 2020/0313581 A1 | 10/2020 | Chon et al. | |
| 2020/0361323 A1 | 11/2020 | Chon et al. | |
| 2020/0376967 A1 | 12/2020 | Furukawa et al. | |
| 2021/0044135 A1* | 2/2021 | Lee | H02J 7/1492 |

FOREIGN PATENT DOCUMENTS

| | | |
|---|---|---|
| DE | 10 2018 124787 A1 | 4/2020 |
| JP | 2006050842 A | 2/2006 |
| WO | 2020/248023 A1 | 12/2020 |

OTHER PUBLICATIONS

Communication pursuant to Rule 69 EPC received for European Patent Application No. 22159437. 7 dated Sep. 12, 2022, 2 pages.
Communication pursuant to Article 94(3) EPC received for European Patent Application Serial No. 22159437.7 dated Mar. 18, 2024, 9 pages.
CN Office Action dated Oct. 21, 2024 for CN Application No. 202210206446.4.
Second Office Action received for Chinese Patent Application Serial No. 202210206446.4 dated Mar. 7, 2025, 20 pages(Including English Translation).
Rejection Decision for CN Application No. 202210206446.4 dated Jun. 18, 2025.

\* cited by examiner

VOLTAGE CONVERSION SYSTEM FOR BATTERY ELECTRIC POWERTRAIN WITH COMMON MINUS-POLE

CROSS-REFERENCE TO RELATED APPLICATION

This application claims priority to U.S. Provisional Patent Application No. 63/155,036, filed on Mar. 1, 2021, and entitled "VOLTAGE CONVERSION SYSTEM FOR BATTERY ELECTRIC POWERTRAIN WITH COMMON MINUS-POLE," the entirety of which application is hereby incorporated by reference herein.

TECHNICAL FIELD

The disclosed subject matter relates to electric vehicle charging systems, and more particularly, to voltage conversion systems that leverage a common minus-pole for battery electric vehicles.

BACKGROUND

Electric vehicles are becoming increasingly prevalent worldwide, and are poised to become one of the most common modes of transportation. With this pivot in transportation technology, there exist increasing power demands on electric vehicles and corresponding batteries. Electrical vehicles are beginning to adopt 800 volt battery systems. However, most existing charging stations have a maximum output voltage of 500 volt and are designed to charge 400 volt battery electric vehicles (BEVs). Consequently, 800 volt electric vehicles typically comprise an onboard direct current to direct current (DC-DC) voltage booster converter in order to utilize a 500 volt charging station to charge the 800 volt battery. However, such DC-DC voltage booster converters consume a considerable amount of the limited space inside a vehicle, and add to the cost of a corresponding electric vehicle.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. As described, there exists a need for a cheaper, more space-efficient boosting system for charging 800 volt electric vehicles with 500 volt charging stations (or other voltage electric vehicles that comprise voltages greater than voltages of charging stations).

According to an embodiment, an electric vehicle charging system can comprise an electric motor drive system comprising a three-phase electric motor and an inverter; a negative cable connected to an electric vehicle inlet and a battery; and a booster charging cable connected to a star-point of the three-phase electric motor and to a positive pole of the electric vehicle inlet, wherein the booster charging cable bypasses a connection between the positive pole and the battery.

According to another embodiment, an electric vehicle can comprise an electric motor drive system comprising a three-phase electric motor and an inverter; a negative cable connected to an electric vehicle inlet and a battery; and a booster charging cable connected to a star-point of the three-phase electric motor and to a positive pole of the electric vehicle inlet, wherein the booster charging cable bypasses a connection between the positive pole and the battery.

According to an additional embodiment, a method can comprise determining, by a system comprising a processor, a maximum voltage of a battery of an electric vehicle and a voltage supplied to an inlet of the electric vehicle; and in response to a determination, by the system, that the maximum voltage of the battery is greater than the voltage supplied to the inlet of the electric vehicle: closing, by the system, a first breaker in line with a negative cable, wherein the negative cable is connected to the inlet; opening, by the system, a second breaker of a positive cable, wherein the positive cable is disconnected from the inlet and from a positive pole of the battery; and closing, by the system, a third breaker comprising a charging station voltage charging breaker, wherein the third breaker is located between the positive cable and a star-point of a three-phase electric motor.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It will be understood that when an element is referred to as being "coupled" to another element, it can describe one or more different types of coupling including, but not limited to, chemical coupling, communicative coupling, capacitive coupling, electrical coupling, electromagnetic coupling, inductive coupling, operative coupling, optical coupling, physical coupling, thermal coupling, and/or another type of coupling. As referenced herein, an "entity" can comprise a human, a client, a user, a computing device, a software application, an agent, a machine learning model, an artificial intelligence, and/or another entity. It should be appreciated that such an entity can facilitate implementation of the subject disclosure in accordance with one or more embodiments the described herein.

Figure 1:
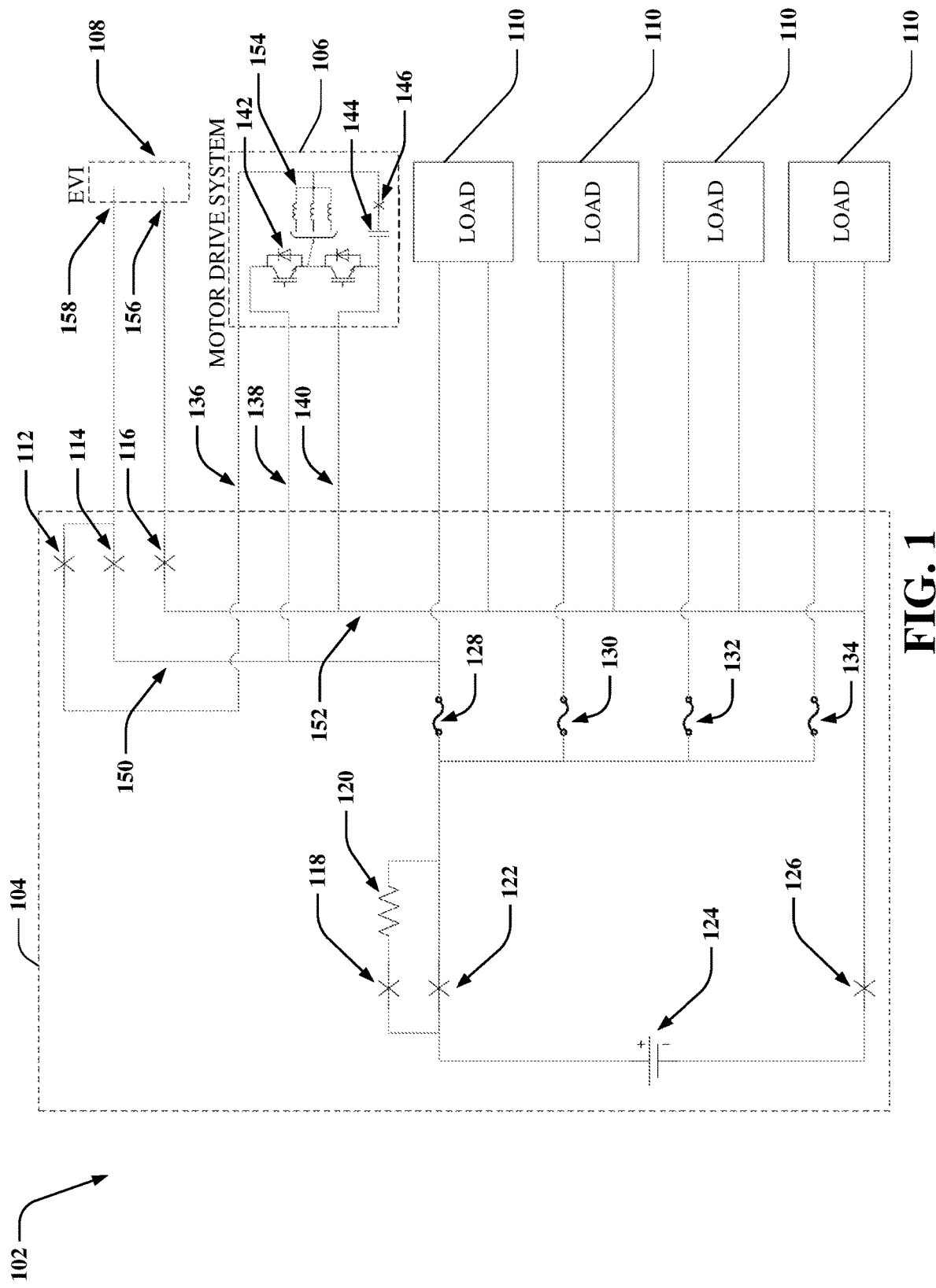
FIG. 1 illustrates a block diagram of an example electric vehicle charging system in accordance with one or more embodiments described herein.

FIG. 1 illustrates an example, a non-limiting charging system 102 (e.g., of an electric vehicle such as a vehicle 806 as later discussed in greater detail with respect to FIG. 8) in accordance with one or more embodiments described herein. In various embodiments, charging system 102 can comprise a battery assembly 104, a motor drive system (MDS) 106, an electric vehicle inlet (EVI) 108, cable 136, cable 138, cable 140, cable 150, cable 152, positive pole 158, and/or negative pole 156.

In one or more embodiments, the battery assembly 104 can comprise breaker 116 (e.g., a first breaker), breaker 114 (e.g., a second breaker), breaker 112 (e.g., a third breaker), breaker 118, capacitor 120, breaker 122, battery 124 (e.g., a high voltage (HV) battery such as an 800 volt battery), breaker 126, fuse 128, fuse 130, fuse 132, and/or fuse 134. In various embodiments, the fuse 128, fuse 130, fuse 132, and/or fuse 134 can be located on positive cables of respective load(s) 110 (e.g., high voltage loads). In this regard, such loads 110 can comprise one or more of lights, heating, air conditioning, inverters, or other suitable loads). In various implementations, the breaker 112 can comprise a 500 volt charging breaker, breaker 114 can comprise an 800 volt charging breaker, and the breaker 116 can comprise a negative pole breaker (e.g., a minus pole breaker). It is noted that the breaker 114, when closed (e.g., and when breaker 112 is opened), can enable direct HV charging directly from the EVI 108 to the battery 124 (e.g., when the EVI 108 and the battery 124 comprise the same or compatible voltages (e.g., 800 volts). It is further noted that positive pole 158 can comprise a positive pole of the EVI 108, and the negative pole 156 can comprise a negative pole of the EVI 108.

In one or more embodiments, the MDS 106 (e.g., an 800 volt MDS) can comprise inverter 142, capacitor 144, breaker 146, and/or three-phase electric motor 154. In various implementations, the breaker 146 (e.g., a filter breaker) can disconnect the capacitor 144 from the three-phase electric motor 154, for example, during driving of a corresponding electric vehicle via operation of the three-phase electric motor 154. It is noted that in one or more embodiments, the capacitor 144 and breaker 146 can be located in line with the EVI 108 and/or a star-point (e.g., a y-connection) of the three-phase electric motor 154. In various embodiments, cable 136 (e.g., booster charging cable or a 500 volt charging cable), cable 138 (e.g., an 800 volt charging cable or a HV DC positive cable), and cable 140 (e.g., a common negative-pole cable, a common minus pole cable, and/or a HV DC negative cable) can be connected between the MDS 106 and the battery assembly 104. It is noted that the cable 136 can be connected to a star-point of the three-phase electric motor 154 and to the positive pole 158 of the EVI 108. In this regard, wherein the cable 136 can bypass a connection between the positive pole 158 and the battery 124. Therefore, in one or more embodiments, only the booster charging cable (e.g., cable 136) is added between the battery 124 and the inverter 142, since the negative pole cable (e.g., cable 152) is shared between the battery 124 and the inverter 142.

In one or more embodiments, motor drive system DC-cables (e.g., cable 138 and cable 140) can comprise a lower current capacity than the booster charging cable or 500 volt charging current cable (e.g., cable 136) that can carry EVI 108 current. In various embodiments, if battery 124 voltage is 800 volts, and corresponding battery charger voltage is 400 volts, then cable 138 and cable 140 can carry only 50% of the EVI 108 current, thus reducing or eliminating a need to up-size cable 138 or cable 140.

In various embodiments, the cable 150 can be utilized in 800 volt DC fast charging, and the cable 136 can be utilized with DC charging from a 500 volt charging station. In this regard, the breaker 114 can be located in line with the cable 150, and the breaker 112 can be located in line with the cable 136. In an embodiment, the cable 152 can comprise a negative cable, which can be connected to a star-point of the three-phase electric motor 154. According to an embodiment, the breaker 116 can be located in line with the cable 152.

In various embodiments, in order to charge the battery 124 from a charging station (e.g., via EVI 108) that comprises a voltage less than that of the battery 124 (e.g., 800 volt battery and 500 volt charging station), breaker 116 can be closed, breaker 114 can be opened, and breaker 112 can be closed. In order to charge the battery 124 from a charging station (e.g., via EVI 108) that comprises a voltage equal (e.g., or threshold equal) to that of the battery 124 (e.g., 800 volt battery and 800 volt charging station), breaker 116 can be closed, breaker 114 can be closed, and breaker 112 can be opened. In various embodiments, opening and closing of breakers or switches herein can be controlled by a controller (e.g., a vehicle controller 808 as later discussed in greater detail). In further embodiments, a threshold imbalance or equality between the battery 124 and a charging station can trip a circuit (e.g., without utilizing such a controller), which can cause the one or more breakers herein to accordingly open or close.

Figure 2:
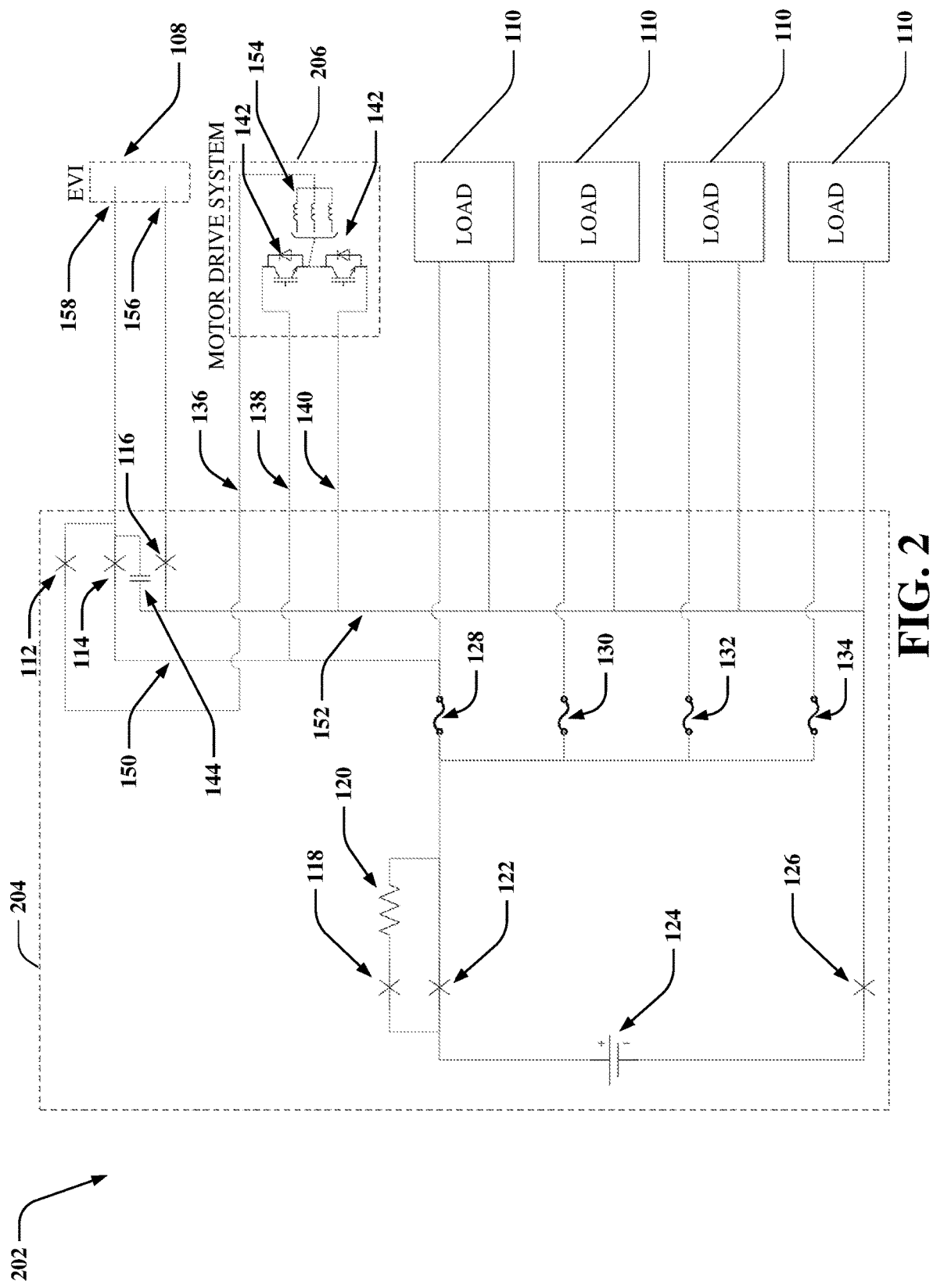
FIG. 2 illustrates a block diagram of an example electric vehicle charging system in accordance with one or more embodiments described herein.

Turning now to FIG. 2, there is illustrated a non-limiting charging system 202 (e.g., of an electric vehicle) in accordance with one or more embodiments described herein. Repetitive description of like elements and/or processes employed in respective embodiments is omitted for sake of brevity. In various embodiments, charging system 202 can comprise a battery assembly 204, an MDS 206, an electric vehicle inlet (EVI) 108, cable 136, cable 138, cable 140, cable 150, and/or cable 152.

In one or more embodiments, the battery assembly 204 can comprise breaker 116 (e.g., a first breaker), breaker 114 (e.g., a second breaker or a high voltage charging breaker), breaker 116 (e.g., a third breaker or a charging station voltage charging breaker), breaker 118, capacitor 120, breaker 122, battery 124 (e.g., a high voltage battery such as an 800 volt battery), breaker 126, fuse 128, fuse 130, fuse 132, fuse 134, and/or capacitor 144. In various embodiments, the fuse 128, fuse 130, fuse 132, and/or fuse 134 can be located on positive cables of respective load(s) 110 (e.g., high voltage loads). In various implementations, the breaker 112 can comprise a 500 volt charging breaker, breaker 114 can comprise an 800 volt charging breaker, and the breaker 116 can comprise a negative pole breaker. It is noted that the breaker 114, when closed, can enable direct HV charging directly from the EVI 108 to the battery 124 (e.g., when the EVI 108 and the battery 124 comprise the same or compatible voltages (e.g., 800 volts). According to an embodiment, breaker 114 can disconnect the capacitor 144 (e.g., a filter capacitor or a ripple filter) without requiring an additional breaker (e.g., breaker 146 as in FIG. 1) (e.g., to disconnect the capacitor 144 during driving of an electric vehicle comprising the charging system 202. In various embodiments, breaker 112, beaker 114, and breaker 116 can be opened during a driving operation of a corresponding electric vehicle comprising the charging system 202. In various embodiments, cable 136 (e.g., a booster charging cable or a 500 volt charging cable), cable 138 (e.g., an 800 volt charging cable), and cable 140 (e.g., a common negative-pole cable) can be connected between the MDS 106 and the battery assembly 104.

According to an embodiment and as compared to charging system 102, in charging system 202, when the capacitor 144 (e.g., an electromagnetic interference (EMI) filter) (e.g., a capacitor filter) is moved into the battery assembly 204, the size of the MDS 206 can be further reduced. In this regard, breaker 114 can disconnect the capacitor 144 without requiring an additional filter-breaker (e.g., breaker 146 in FIG. 1). By further reducing the size of the MDS (e.g., MDS 206 vs MDS 106), available space in a corresponding electric vehicle can be further increased (e.g., thus yielding additional leg room, seating space, storage, spare tires, etc.). In the charging system 202, breaker 112, EVI-breakers (e.g., breaker 114 and breaker 116), and capacitor 144 can be located within the battery assembly 204. It is noted that the breaker 114 can also function as a bypass switch in order to enable direct 800 volt charging between the EVI 108 and the battery 124. Cable 136, cable 138, and cable 140 can connect the MDS 206 and the battery 124.

Figure 3:
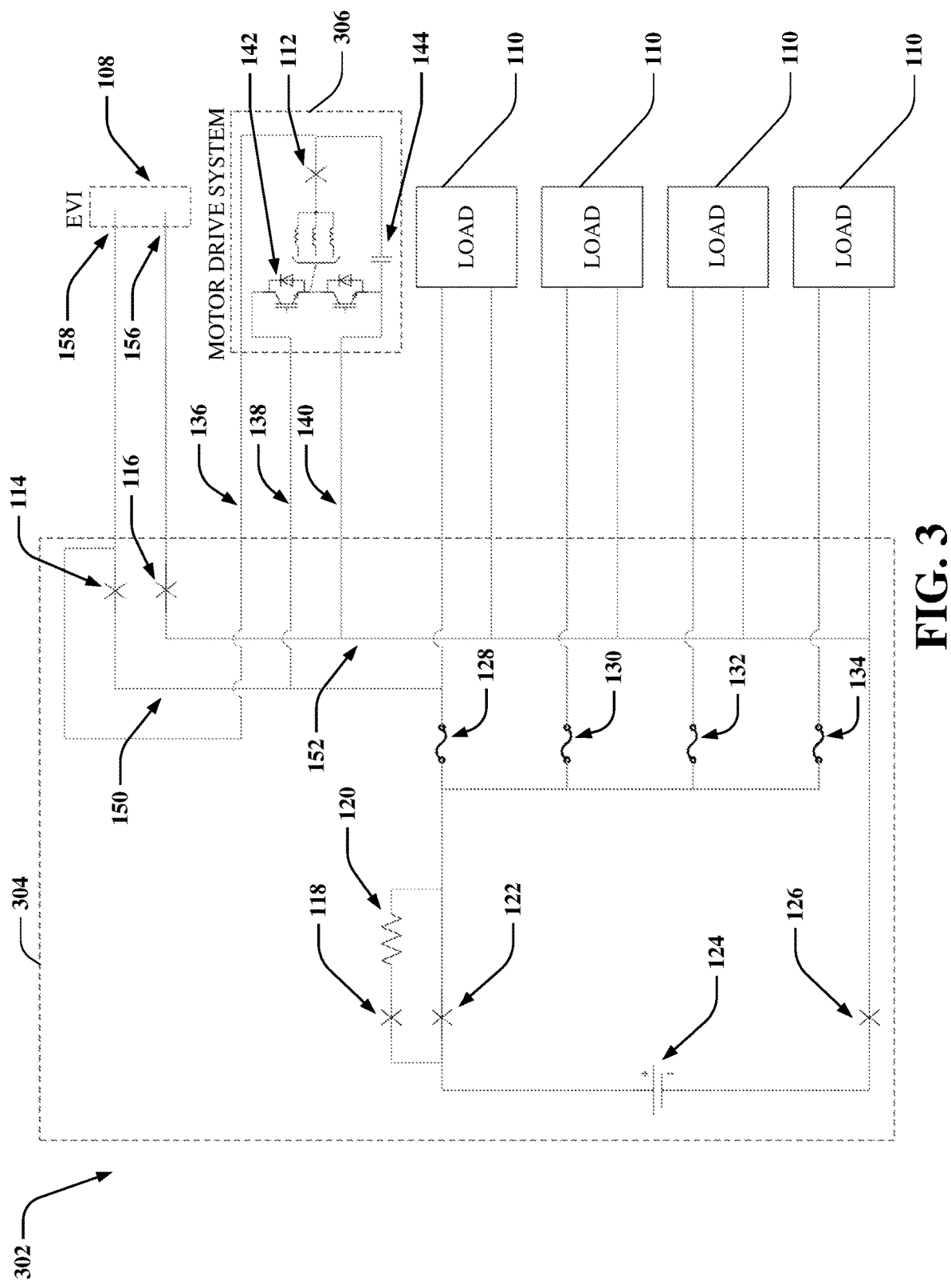
FIG. 3 illustrates a block diagram of an example electric vehicle charging system in accordance with one or more embodiments described herein.

Turning now to FIG. 3, there is illustrated a non-limiting charging system 302 (e.g., of an electric vehicle) in accordance with one or more embodiments described herein. Repetitive description of like elements and/or processes employed in respective embodiments is omitted for sake of brevity. Charging system 302 can be similar to charging system 102 and/or charging system 202, however, in charging system 302 (e.g., as compared to charging system 202), breaker 112 and capacitor 144 are placed in the MDS 306. The charging-breakers (e.g., breaker 114 and breaker 116) are located within the battery assembly 304. In various embodiments, the charging-breaker (e.g., breaker 114) can function as a bypass switch in order to enable direct 800 volt charging). Cable 136, cable 138, and cable 140 can run between the MDS 306 and the battery 124. The breaker 114 can disconnect the capacitor 144 without requiring an additional breaker (e.g., breaker 146) as in charging system 102.

Figure 4:
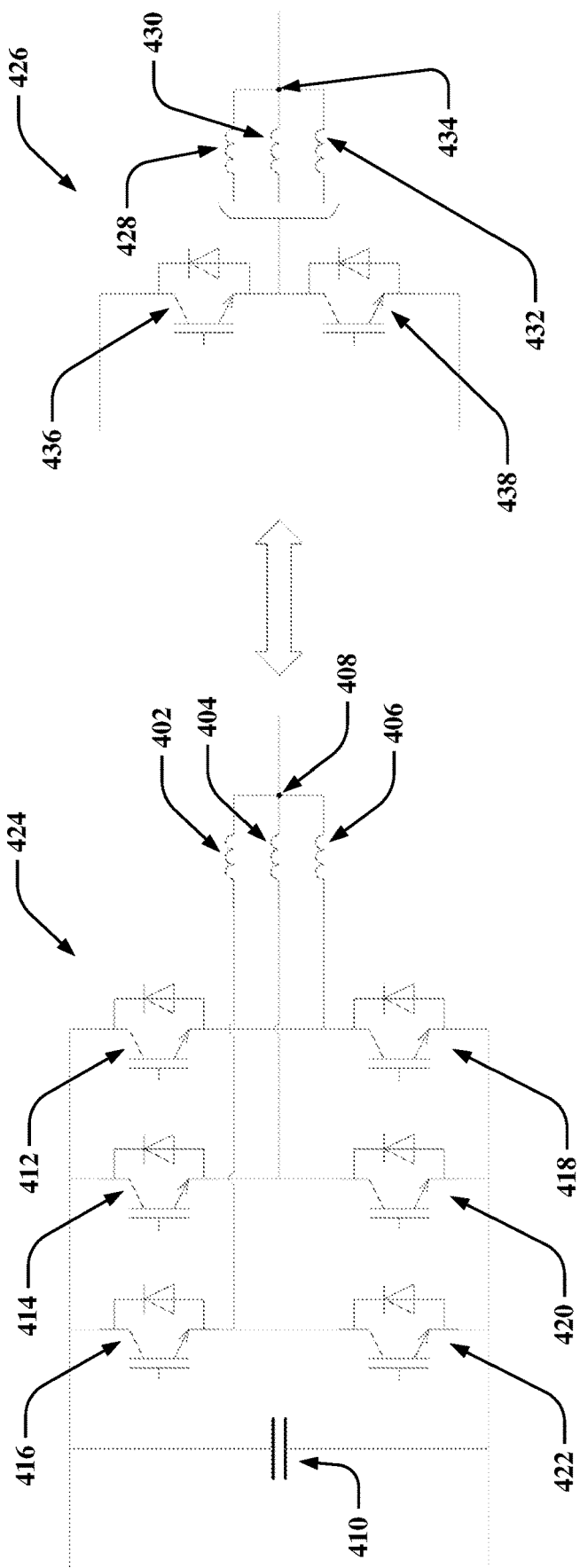
FIG. 4 illustrates a block diagram of an example motor drive system in accordance with one or more embodiments described herein.

FIG. 4 illustrates a simplification (e.g., MDS 426) of the MDS 424 (e.g., for illustrative purposes). In this regard, MDS 424 can be similar to MDS 106, MDS 206, and/or MDS 306. Further in this regard, the MDS 424 can be depicted (e.g., for simplified illustrative purposes) as MDS 426 in various FIGS. and/or embodiments herein. In various embodiments, MDS 424 comprising inductors 402, 404, and 406, star-point 408, capacitor 410, and switches/diodes 416, 412, 414, 416, 418, 420, and/or 422, can be illustrated as MDS 426 comprising inductors 428, 430, and 432, star-point 434, and/or switches/diodes 436, and/or 438. In various implementations, the MDS 424 or MDS 426 can comprise an inductor and a three-phase electric motor.

Figure 5A:
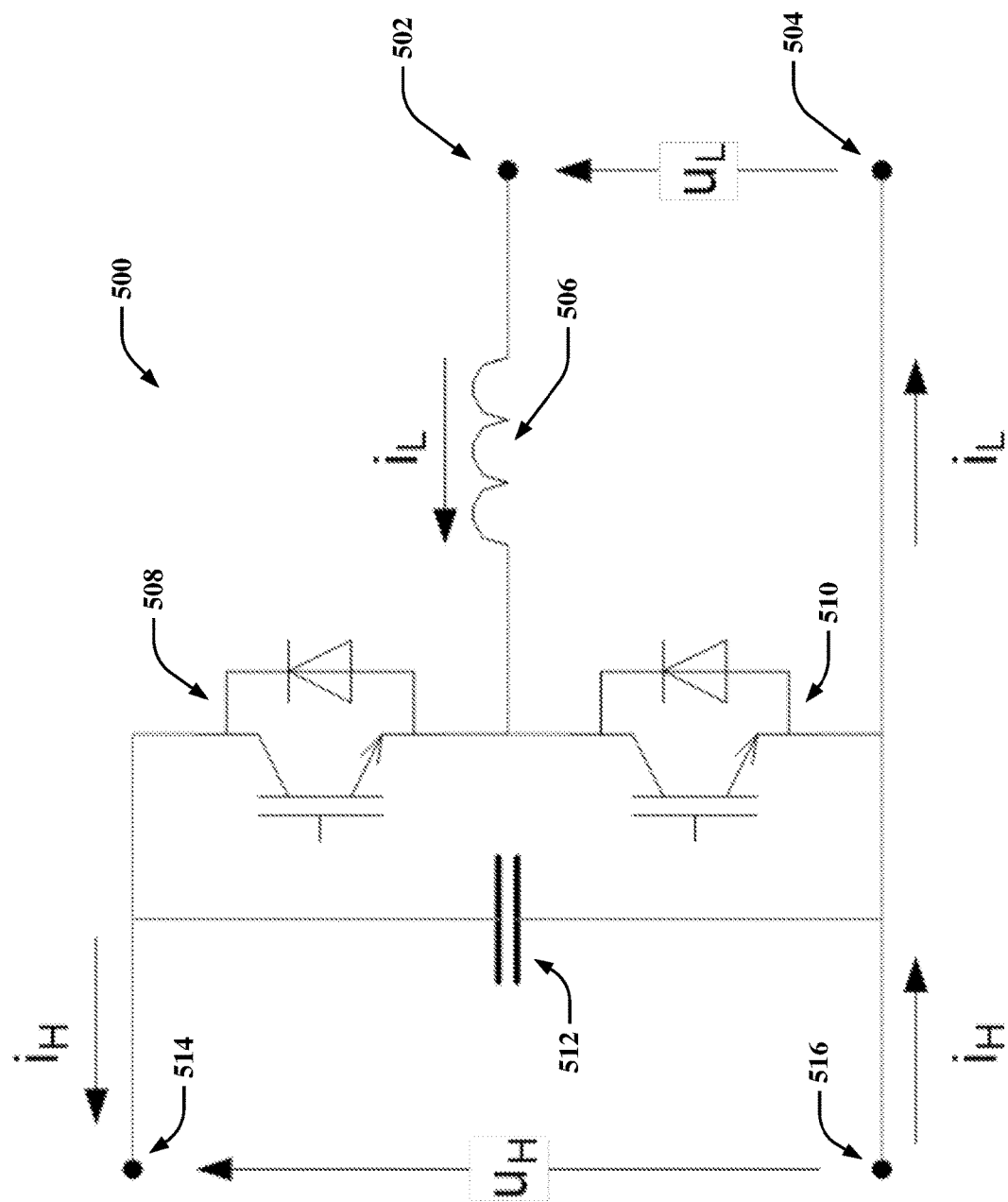
FIGS. 5A and 5B illustrate block diagrams of an example direct current to direct current booster converters in accordance with one or more embodiments described herein.

FIG. 5A illustrates an exemplary direct current to direct current (DC-DC) booster converter 500. The DC-DC booster converter 500 can comprise a charging station voltage negative pole 502, charging station voltage positive pole 504, inductor 506, switch 508, switch 510, capacitor 512, HV negative pole 514, and HV positive pole 516. According to an embodiment, charging station voltage can comprise 500 volts, and HV can comprise 800 volts. When increasing 500 volts to 800 volts, switch 510 can be turned on, and switch 508 can be turned off, allowing the current $i_L$ through the inductor 506 to increase. Next, switch 510 can be turned off, and switch 508 can be turned on, allowing current to flow into the HV side. This can be cycled (e.g., according to a 50/50 duty ratio) to continuously boost voltage from 500 volts to 800 volts, while the capacitor 512 can smooth the corresponding ripple current on the HV side. It is noted that DC-DC booster converter 500 is an exemplary converter with two poles in, and two poles out. In various embodiments, currents and/or ratings of cables (e.g., a charging current cable), can be determined as follows:
The Pulse-Width Modulation (PWM) duty ratio d is:

$$0 \le d = \frac{u_L}{u_H} \le 1 \qquad \text{Equation (1)}$$

where $u_L$ is the low-side voltage and $u_H$ is the high-side voltage. In steady-state (e.g., neglecting the current and voltage ripple), the high-side current is:

$$i_H = i_L \cdot d \qquad (2)$$

where $i_L$ is the low-side current and $i_H$ is the high-side current.

Figure 5B:
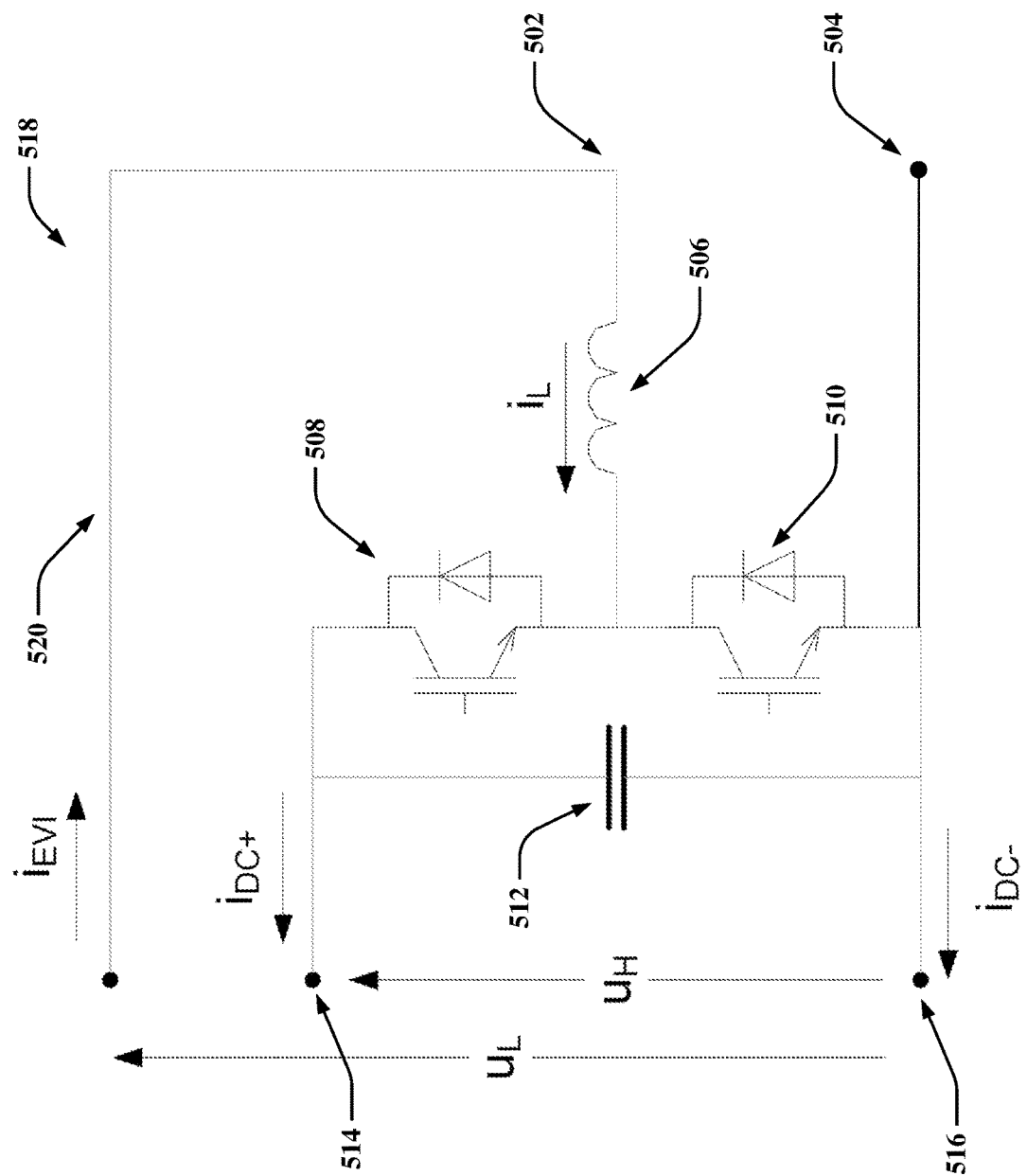

FIG. 5B illustrates shows a two-quadrant DC-DC booster converter 518 and corresponding currents and voltages (e.g., with a common minus-pole DC-busbar/cable) in accordance with one or more embodiments described herein). The two-quadrant DC-DC booster converter 518 can comprise a charging station voltage negative pole 502 (e.g., a common minus pole), charging station voltage positive pole 504, inductor 506, switch 508, switch 510, capacitor 512, HV negative pole 514, HV positive pole 516, and cable 520 (e.g., a 500 volt charging cable). According to an embodiment, charging station voltage can comprise 500 volts, and HV can comprise 800 volts. When increasing 500 volts to 800 volts, switch 510 can be turned on, and switch 508 can be turned off, allowing the current $i_L$ through the inductance to increase. Next, switch 510 can be turned off, and switch 508 can be turned on, allowing current to flow into the HV side. This can be cycled (e.g., according to a 50/50 duty ratio) to continuously boost voltage from 400 volts to 800 volts, while the capacitor 512 can smooth the corresponding ripple current on the HV side. The battery voltage is $u_{batt}=u_H$, the battery current is $i_{batt}=i_H=i_{DC+}$, and the EVI-current is $i_{EV1}=i_L$. In various embodiments, the positive cable current can comprise the high-side current.

$$i_{DC+}=i_H=i_L \cdot d=i_{EV1} \cdot d \qquad (3)$$

The negative pole cable current is:

$$i_{DC-}=i_L-i_H=i_L \cdot (1-d)=i_{EV1} \cdot (1-d) \qquad (4)$$

Figure 6:
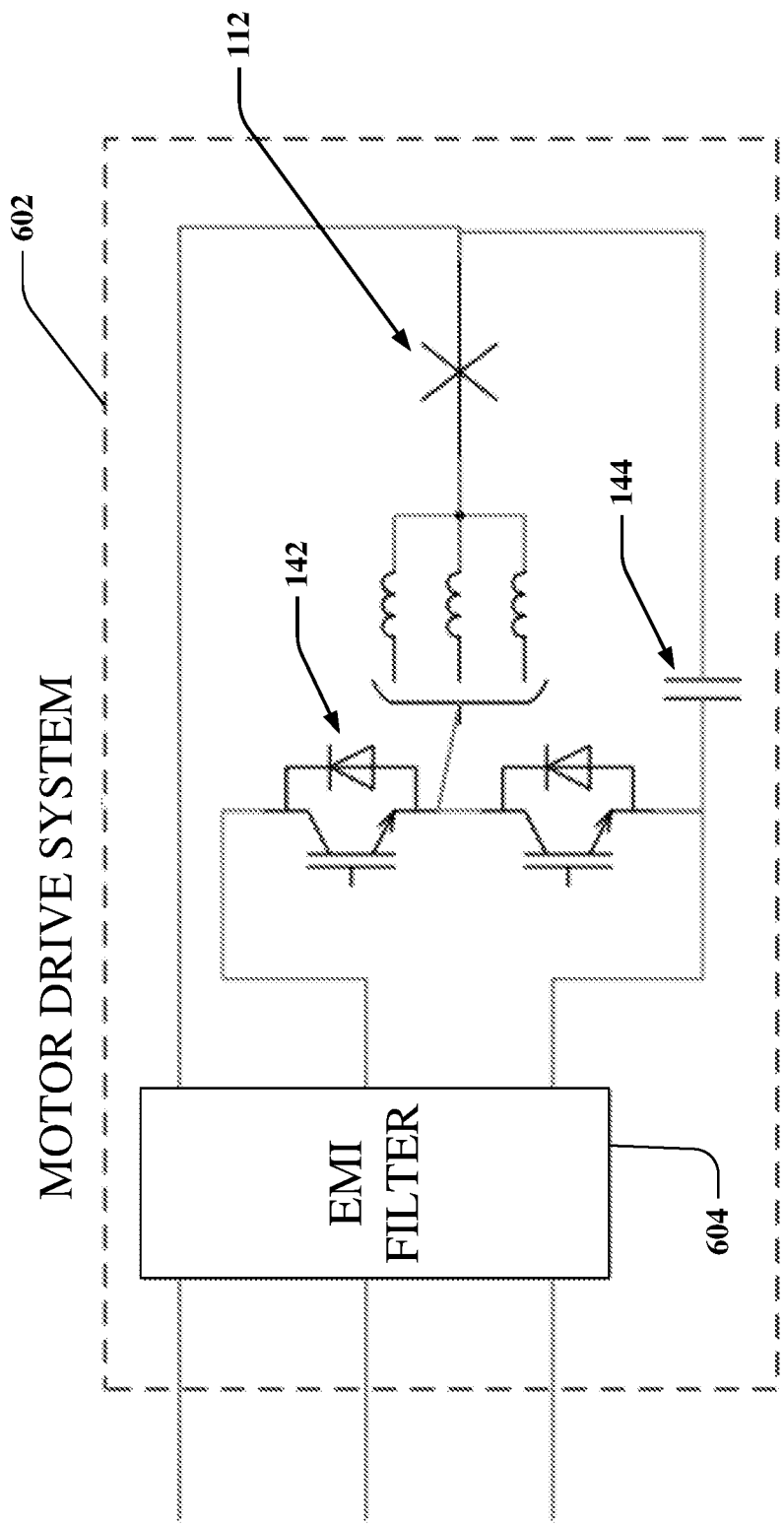
FIG. 6 illustrates a block diagram of an example motor drive system in accordance with one or more embodiments described herein.

FIG. 6 illustrates an exemplary MDS 602 in accordance with various embodiments herein. Repetitive description of like elements and/or processes employed in respective embodiments is omitted for sake of brevity. In this regard, MDS 602 comprises a common minus-pole, which in various embodiments only utilizes one EMI filter 604. Reducing the quantity of EMI filters (e.g., from two EMI filters in systems that do not comprise a common minus pole, to one EMI filter, as in MDS 602, can reduce cost, weight, and volume of the MDS 602 herein).

Figure 7:
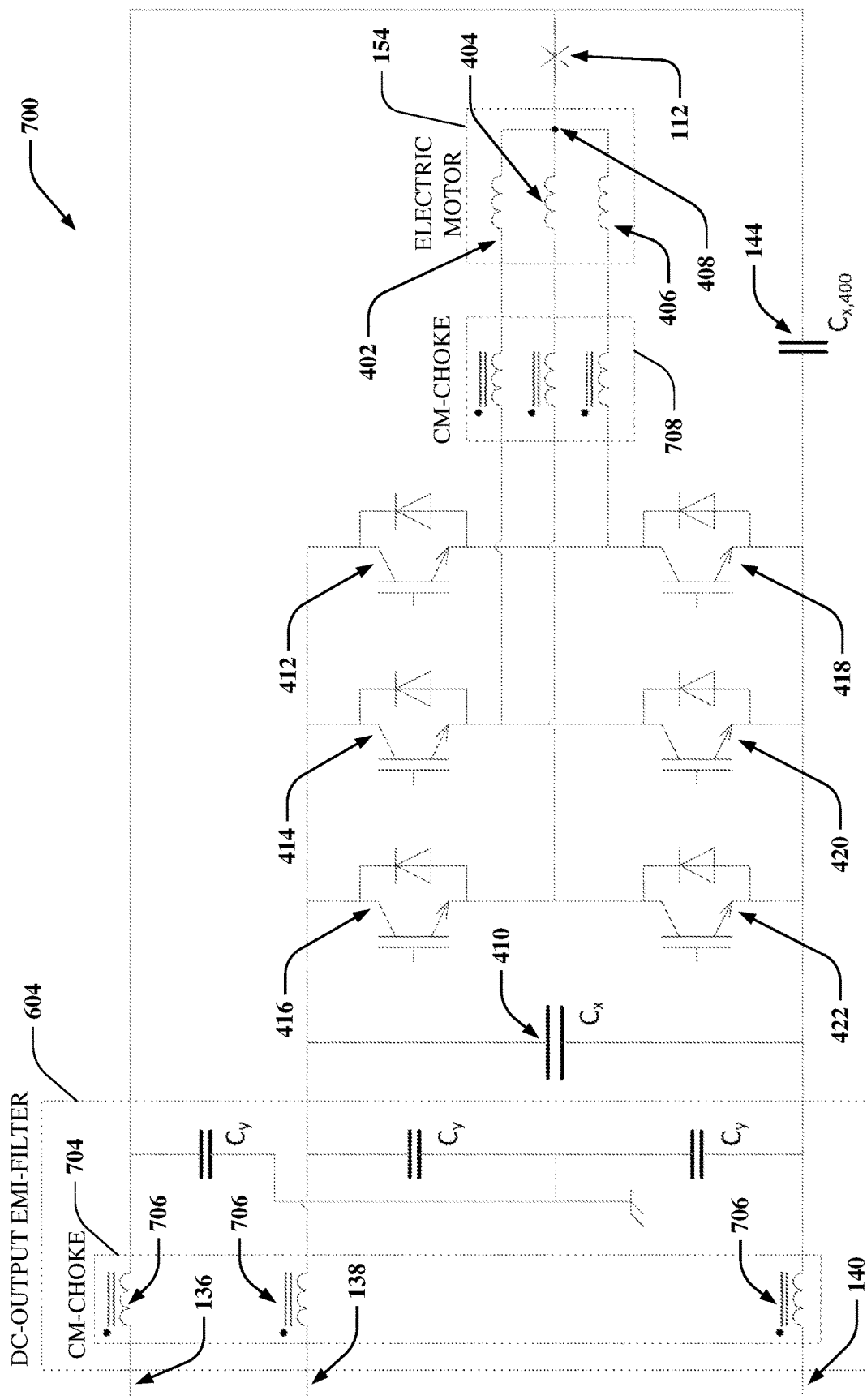
FIG. 7 illustrates a block diagram of an example motor drive system in accordance with one or more embodiments described herein.

FIG. 7 illustrates an exemplary MDS 700 in accordance with various embodiments herein. Repetitive description of like elements and/or processes employed in respective embodiments is omitted for sake of brevity. MDS 700 can be similar to MDS 424 and/or MDS 602. MDS 700 can additionally comprise common mode (CM) choke 704 and/or CM choke 708. In various embodiments, CM choke 704 and/or CM choke 708 can comprise one or more ring ferrites 706. In one or more embodiments, CM choke 704 and/or CM choke 708 can block higher-frequency alternating common-mode currents while passing direct current and lower-frequencies alternating current in the MDS 700.

Figure 8:
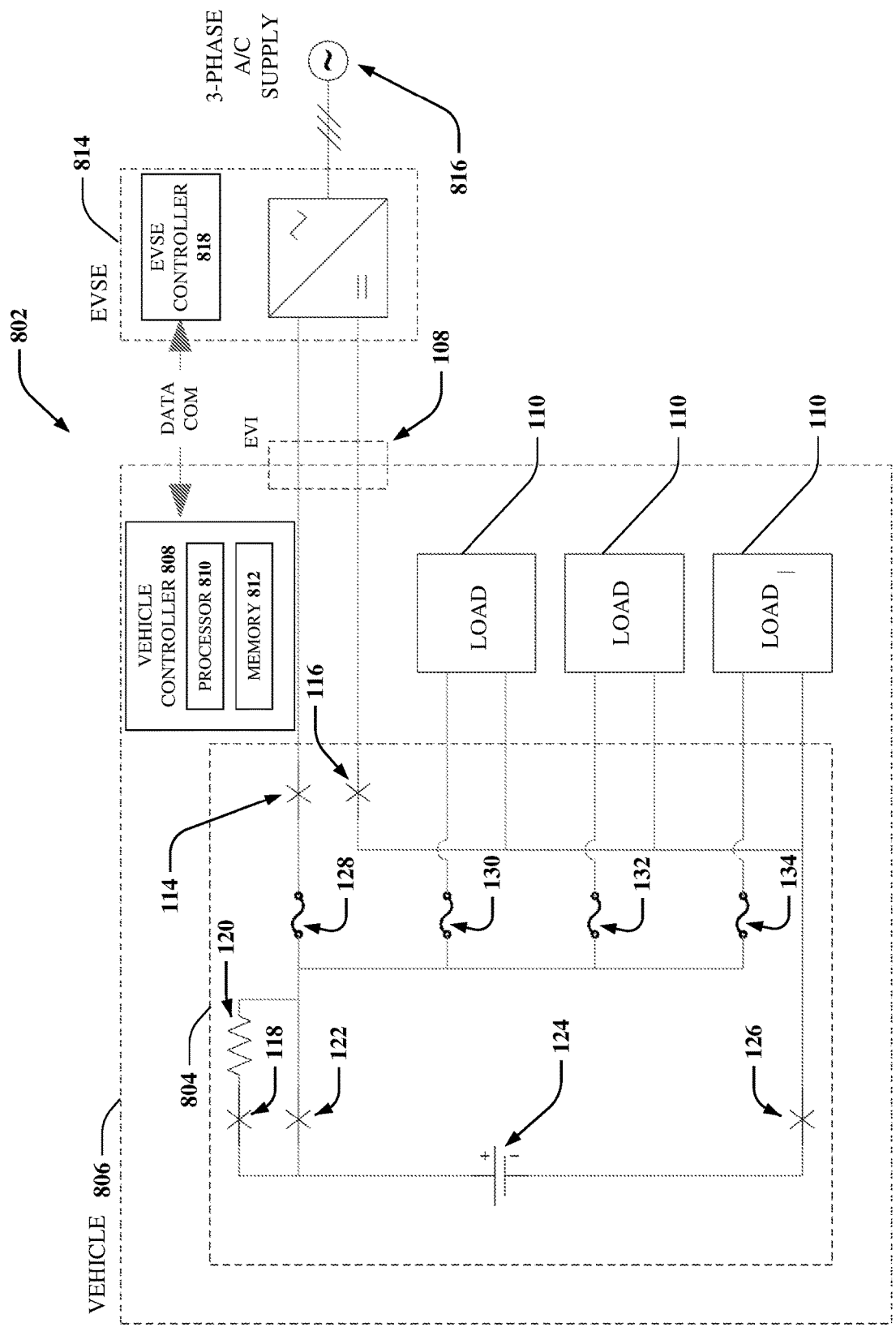
FIG. 8 illustrates a block diagram of an example electric vehicle charging system in accordance with one or more embodiments described herein.

FIG. 8 illustrates a non-limiting charging system 802 in accordance with one or more embodiments described herein. In various embodiments, the charging system 802 can comprise a vehicle 806 (e.g., an electric vehicle herein), an electric vehicle supply equipment (EVSE) 814, which can comprise an external fast-charge stations (e.g., a DC 500 volt or 800 volt charging station), and/or three-phase A/C power supply 816.

In various embodiments, vehicle 806 can comprise a vehicle controller 808 (e.g., comprising processor 810 and memory 812), battery assembly 804, EVI 108, and/or one or more loads 110. In one or more embodiments, the battery assembly 804 can comprise capacitor 120, breaker 114, breaker 116, breaker 118, breaker 122, breaker 126, battery 124, fuse 128, fuse 130, fuse 132, and/or fuse 134. The EVSE 814 can comprise an EVSE controller 818 (e.g., which can comprise a processor and memory) and an alternating current to direct current (AC-DC) rectifier.

In one or more embodiments, before initiating charging of the battery 124 from the EVSE 814, the vehicle controller 808 can an operational status of the vehicle 806 and corresponding components. In this regard, the vehicle controller 808 can determine system faults of the vehicle 806 (e.g., communicated over a bus or CAN bus network of the vehicle 806). Next the vehicle 806 (e.g., via the vehicle controller 808) can communicate with the EVSE 814 (e.g., in order to obtain charging approval or a handshake from the EVSE 814). In this regard, voltage from the EVSE 814 to the EVI 108 can be controlled or set to a level compatible with the vehicle 806. In various embodiments, the vehicle controller 808 can open or close the DC-charging breakers (e.g., breaker 112 or breaker 114) or any other breaker such as a filter breaker (e.g., breaker 146). During charging, the vehicle 806 and the EVSE 814 can communicate in order to determine (e.g., by the vehicle controller 808 or EVSE controller 818) corresponding control modes (e.g., current or voltage control) and suitable setpoints of power, voltage and/or current. It is noted that before or during a driving operation of the vehicle 806, the vehicle controller 808 can determine or verify system faults of the vehicle 806 and/or open the DC-charging breakers (e.g., breaker 112 and/or breaker 114) or any other breaker such as a filter breaker (e.g., breaker 146). Next, the vehicle 806 can continue or initiate its power-up or driving sequence.

Figure 9:
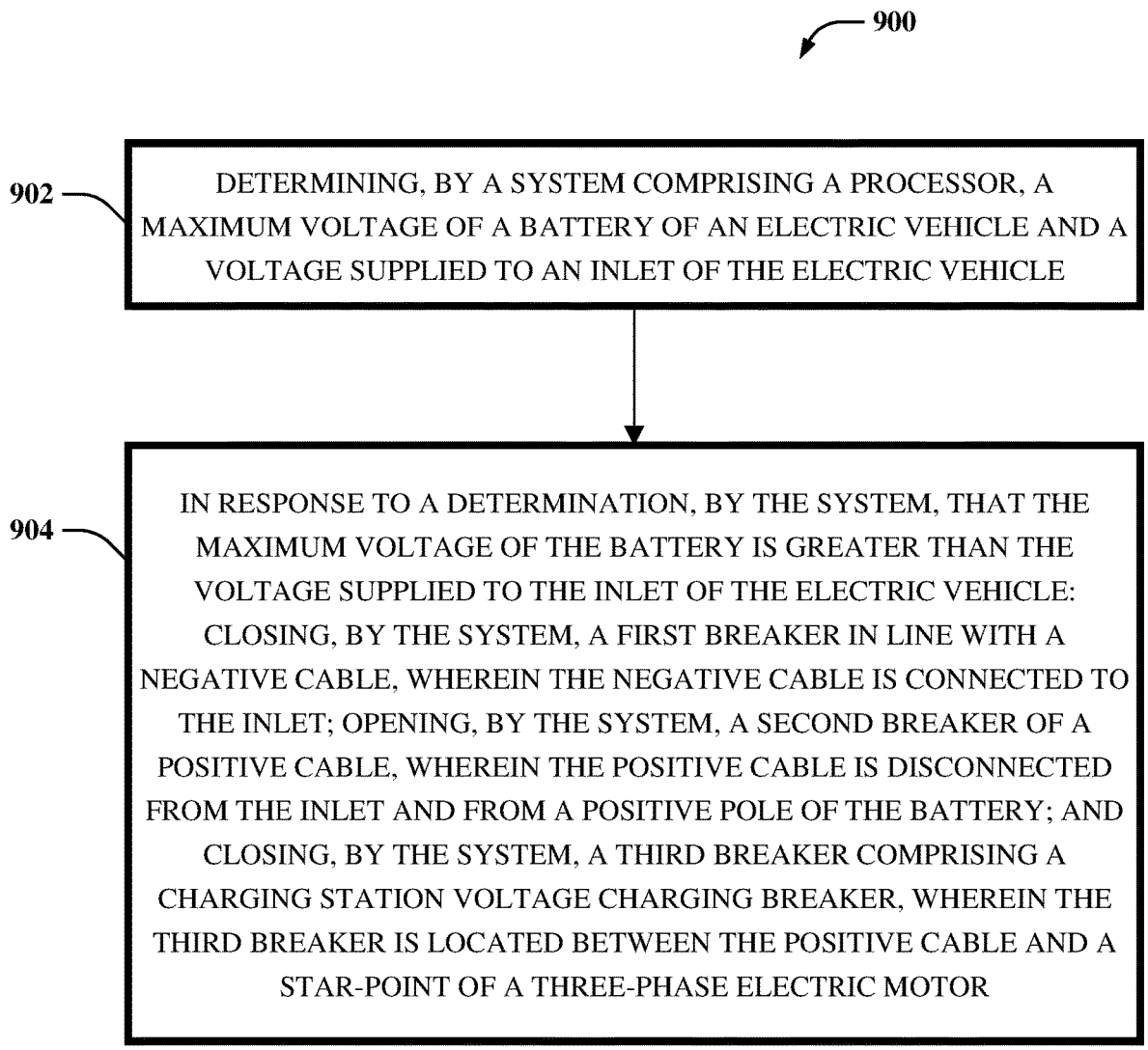
FIG. 9 illustrates a flow diagram of an example, non-limiting battery charging process in accordance with one or more embodiments described herein.

FIG. 9 illustrates a flow diagram of an example, non-limiting battery charging process 900 in accordance with one or more embodiments described herein. Repetitive description of like elements and/or processes employed in respective embodiments is omitted for sake of brevity. At 902, process 900 can comprise determining, by a system comprising a processor (e.g., vehicle controller 808), a maximum voltage of a battery (e.g., battery 124) of an electric vehicle (e.g., vehicle 806) and a voltage supplied to an inlet (e.g., EVI 108) of the electric vehicle. At 904, process 900 can comprise in response to a determination, by the system, that the maximum voltage of the battery is greater than the voltage supplied to the inlet of the electric vehicle: closing, by the system, a first breaker (e.g., breaker 116) in line with a negative cable (e.g., cable 152), wherein the negative cable is connected to the inlet; opening, by the system, a second breaker (e.g., breaker 114) of a positive cable (e.g., cable 150), wherein the positive cable is disconnected from the inlet and from the battery; and closing, by the system, a third breaker (e.g., breaker 112) comprising a charging station voltage charging breaker, wherein the third breaker is located between the positive cable and a star-point of a three-phase electric motor (e.g., three-phase electric motor 154).

Various systems herein can comprise a memory which can store one or more computer/machine readable and/or executable components and/or instructions that, when executed by a processor (e.g., a classical processor, a quantum processor, etc.), can facilitate performance of operations defined by the executable component(s) and/or instruction(s). The memory can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures.

Various systems herein can comprise a processor which can comprise one or more types of processors and/or electronic circuitry (e.g., a classical processor, graphics processor, a quantum processor, etc.) that can implement one or more computer and/or machine readable, writable, and/or executable components and/or instructions that can be stored on a memory. For example, the processor can perform various operations that can be specified by such computer and/or machine readable, writable, and/or executable components and/or instructions including, but not limited to, logic, control, input/output (I/O), arithmetic, and/or the like. In some embodiments, processors herein can comprise one or more central processing unit, multi-core processor, microprocessor, dual microprocessors, microcontroller, System on a Chip (SOC), array processor, vector processor, quantum processor, and/or another type of processor.

Systems described herein can be coupled (e.g., communicatively, electrically, operatively, optically, etc.) to one or more local or remote (e.g., external) systems, sources, and/or devices (e.g., electronic control systems (ECU), classical and/or quantum computing devices, communication devices, etc.). For example, systems herein (or other systems, controllers, processors, etc.) can be coupled (e.g., communicatively, electrically, operatively, optically, etc.) to one or more local or remote (e.g., external) systems, sources, and/or devices using a data cable (e.g., High-Definition Multimedia Interface (HDMI), recommended standard (RS), Ethernet cable, etc.) and/or one or more wired networks described below.

In some embodiments, systems herein can be coupled (e.g., communicatively, electrically, operatively, optically, etc.) to one or more local or remote (e.g., external) systems, sources, and/or devices (e.g., electronic control units (ECU), classical and/or quantum computing devices, communication devices, etc.) via a network. In these embodiments, such a network can comprise one or more wired and/or wireless networks, including, but not limited to, a cellular network, a wide area network (WAN) (e.g., the Internet), and/or a local area network (LAN). For example, a system herein can communicate with one or more local or remote (e.g., external) systems, sources, and/or devices, for instance, computing devices using such a network, which can comprise virtually any desired wired or wireless technology, including but not limited to: powerline ethernet, wireless fidelity (Wi-Fi), BLUETOOTH®, fiber optic communications, global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In this example, systems herein can thus include hardware (e.g., a central processing unit (CPU), a transceiver, a decoder, an antenna (e.g., a ultra-wideband (UWB) antenna, a BLUETOOTH® low energy (BLE) antenna, etc.), quantum hardware, a quantum processor, etc.), software (e.g., a set of threads, a set of processes, software in execution, quantum pulse schedule, quantum circuit, quantum gates, etc.), or a combination of hardware and software that facilitates communicating information between a system herein and remote (e.g., external) systems, sources, and/or devices (e.g., computing and/or communication devices such as, for instance, a smart phone, a smart watch, wireless earbuds, etc.).

Systems herein can comprise one or more computer and/or machine readable, writable, and/or executable components and/or instructions that, when executed by processor (e.g., a classical processor, a quantum processor, etc.), can facilitate performance of operations defined by such component(s) and/or instruction(s). Further, in numerous embodiments, any component associated with a system herein, as described herein with or without reference to the various figures of the subject disclosure, can comprise one or more computer and/or machine readable, writable, and/or executable components and/or instructions that, when executed by a processor, can facilitate performance of operations defined by such component(s) and/or instruction(s). For example, any component associated with systems as disclosed herein (e.g., communicatively, electronically, operatively, and/or optically coupled with and/or employed by a system described herein), can comprise such computer and/or machine readable, writable, and/or executable component(s) and/or instruction(s). Consequently, according to numerous embodiments or systems herein and/or any components associated therewith as disclosed herein, can employ a processor to execute such computer and/or machine readable, writable, and/or executable component(s) and/or instruction(s) to facilitate performance of one or more operations described herein with reference to system herein and/or any such components associated therewith.

Systems herein can comprise any type of system, device, machine, apparatus, component, and/or instrument that comprises a processor and/or that can communicate with one or more local or remote electronic systems and/or one or more local or remote devices via a wired and/or wireless network.

All such embodiments are envisioned. For example, a system herein can comprise a computing device, a general-purpose computer, a special-purpose computer, an onboard computing device, a communication device, an onboard communication device, a server device, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Figure 10:
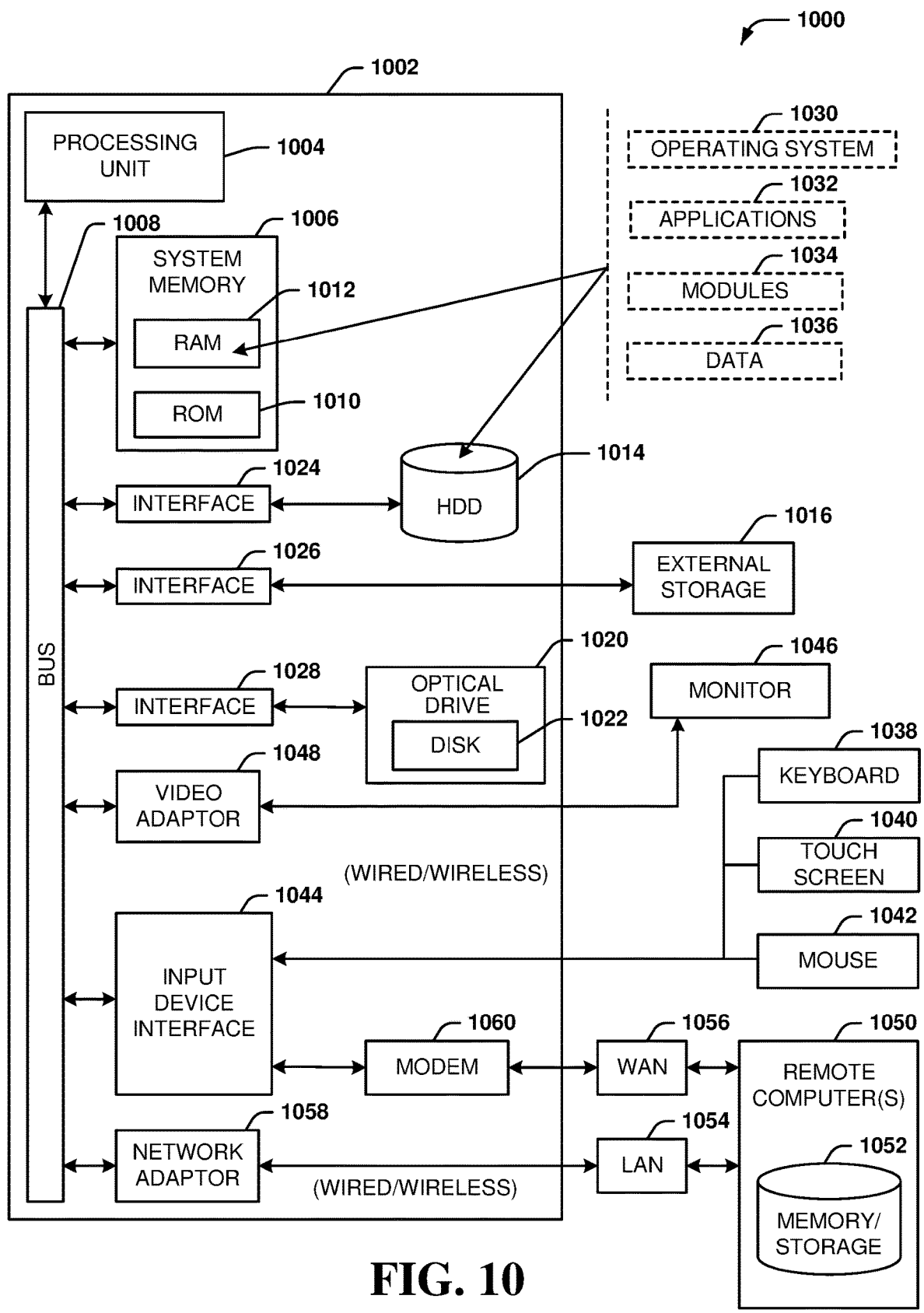
FIG. 10 is an example, non-limiting computing environment in which one or more embodiments described herein can be implemented.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 11:
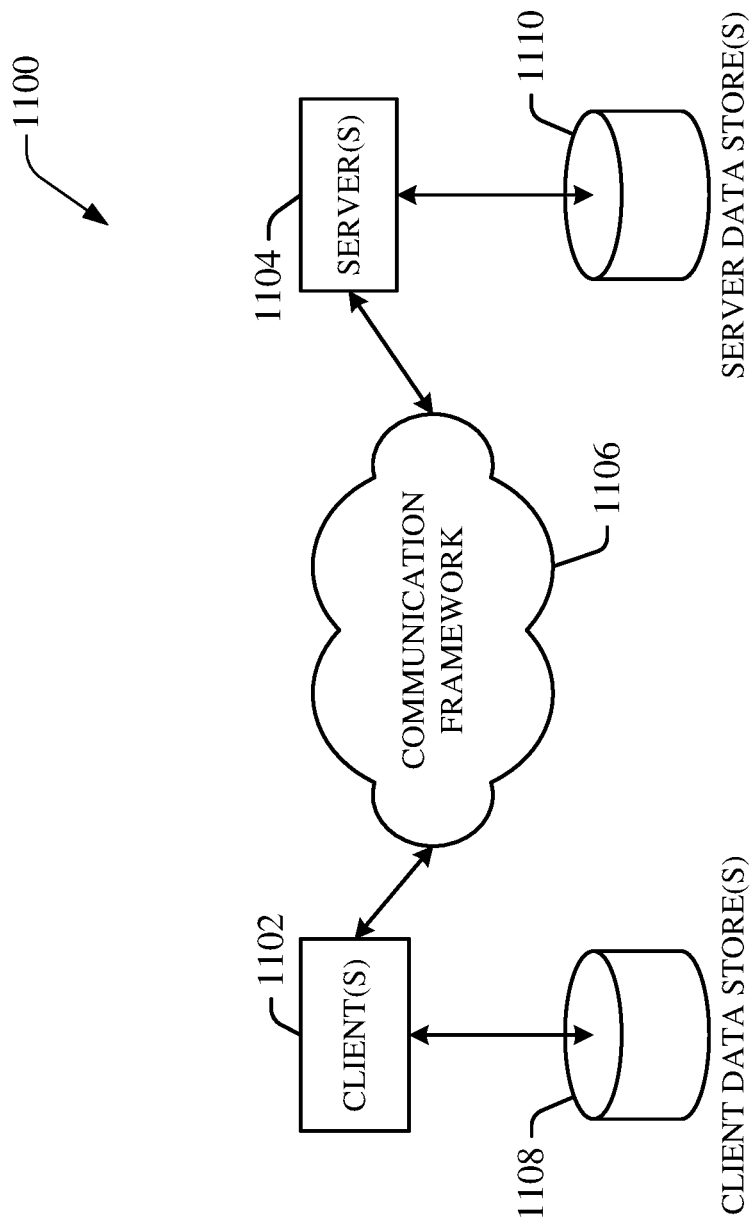
FIG. 11 is an example, non-limiting networking environment in which one or more embodiments described herein can be implemented.

Referring now to FIG. 11, there is illustrated a schematic block diagram of a computing environment 1100 in accordance with this specification. The system 1100 includes one or more client(s) 1102, (e.g., computers, smart phones, tablets, cameras, PDA's). The client(s) 1102 can be hardware and/or software (e.g., threads, processes, computing devices). The client(s) 1102 can house cookie(s) and/or associated contextual information by employing the specification, for example.

The system 1100 also includes one or more server(s) 1104. The server(s) 1104 can also be hardware or hardware in combination with software (e.g., threads, processes, computing devices). The servers 1104 can house threads to perform transformations of media items by employing aspects of this disclosure, for example. One possible communication between a client 1102 and a server 1104 can be in the form of a data packet adapted to be transmitted between two or more computer processes wherein data packets can include coded analyzed headspaces and/or input. The data packet can include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

In one exemplary implementation, a client 1102 can transfer an encoded file, (e.g., encoded media item), to server 1104. Server 1104 can store the file, decode the file, or transmit the file to another client 1102. It is to be appreciated, that a client 1102 can also transfer uncompressed file to a server 1104 and server 1104 can compress the file and/or transform the file in accordance with this disclosure. Likewise, server 1104 can encode information and transmit the information via communication framework 1106 to one or more clients 1102.

The illustrated aspects of the disclosure can also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature can be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further aspects of the invention are provided by the subject matter of the following clauses:

1. An electric vehicle charging system, comprising:
   an electric motor drive system comprising a three-phase electric motor and an inverter;
   a negative cable connected to an electric vehicle inlet and a battery; and
   a booster charging cable connected to a star-point of the three-phase electric motor and to a positive pole of the electric vehicle inlet, wherein the booster charging cable bypasses a connection between the positive pole and the battery.

2. The electric vehicle charging system of any preceding clause, wherein the electric vehicle inlet is supplied an input voltage lower than a voltage of the battery.

3. The electric vehicle charging system of any preceding clause, wherein the input voltage comprises 500 volts, and wherein the battery comprises an 800 volt battery.

4. The electric vehicle charging system of any preceding clause, wherein a battery assembly comprises the battery and a first breaker, and wherein the first breaker is in line with the negative cable.

5. The electric vehicle charging system of any preceding clause, further comprising:
   a positive cable connected to electric vehicle inlet and the battery, wherein the battery assembly further comprises a second breaker comprising a high voltage charging breaker, and wherein the second breaker is in line with the positive cable.

6. The electric vehicle charging system of any preceding clause, wherein the battery assembly further comprises a third breaker comprising a charging station voltage charging breaker, and wherein the third breaker is on the booster charging cable between the electric vehicle inlet and the star-point of the three-phase electric motor.

7. The electric vehicle charging system of any preceding clause, wherein the first breaker, the second breaker, and the third breaker are opened during driving of a vehicle comprising the electric vehicle charging system.

8. The electric vehicle charging system of any preceding clause, wherein the battery assembly further comprises a filter capacitor between the first breaker and the second breaker.

9. The electric vehicle charging system of any preceding clause, wherein electric motor drive system comprises a filter capacitor and breaker connected to the negative cable and the star-point of the three-phase electric motor.

10. The electric vehicle charging system of clause 1 above with any set of combinations of electric vehicle charging systems 2-9 above.

11. An electric vehicle, comprising:
    an electric motor drive system comprising a three-phase electric motor and an inverter;
    a negative cable connected to an electric vehicle inlet and a battery; and
    a booster charging cable connected to a star-point of the three-phase electric motor and to a positive pole of the electric vehicle inlet, wherein the booster charging cable bypasses a connection between the positive pole and the battery.

12. The electric vehicle of any preceding clause, wherein a battery assembly comprises the battery and a first breaker, wherein the first breaker is in line with the negative cable, and wherein the electric vehicle further comprises:
    a positive cable connected to the electric vehicle inlet and the battery, wherein the battery assembly further comprises a second breaker comprising a high voltage charging breaker, and wherein the second breaker is in line with the positive cable.

13. The electric vehicle of any preceding clause, wherein the electric motor drive system comprises a third breaker in line with the star-point of the three-phase electric motor.

14. The electric vehicle of any preceding clause, wherein the electric motor drive system comprises an electromagnetic interference filter or a filter capacitor.

15. The electric vehicle of any preceding clause, wherein the electric vehicle inlet is supplied an input voltage lower than a voltage of the battery.

16. The electric vehicle of any preceding clause, wherein the electric motor drive system comprises an 800 volt electric motor drive system.

17. The electric vehicle of clause 11 above with any set of combinations of electric vehicles 12-16 above.

18. A method, comprising:
determining, by a system comprising a processor, a maximum voltage of a battery of an electric vehicle and a voltage supplied to an inlet of the electric vehicle; and
in response to a determination, by the system, that the maximum voltage of the battery is greater than the voltage supplied to the inlet of the electric vehicle:
closing, by the system, a first breaker in line with a negative cable, wherein the negative cable is connected to the inlet;
opening, by the system, a second breaker of a positive cable, wherein the positive cable is disconnected from the inlet and from a positive pole of the battery; and
closing, by the system, a third breaker comprising a charging station voltage charging breaker, wherein the third breaker is located between the positive cable and a star-point of a three-phase electric motor.

19. The method of any preceding clause, wherein the electric vehicle comprises a battery assembly, and wherein the battery assembly comprises the battery, the first breaker, the second breaker, and the third breaker.

20. The method of any preceding clause, wherein the negative cable is connected to the inlet, the battery, and the star-point of the three-phase electric motor.

21. The method of any preceding clause, wherein inlet is supplied an input voltage lower than a voltage of the battery.

22. The method of any preceding clause, wherein the inlet is connected to a charging station, and wherein the charging station comprises a 500 volt charging station, and wherein the battery comprises an 800 volt battery.

23. The method of clause 18 above with any set of combinations of methods 19-22 above.

What is claimed is:

1. An electric vehicle charging system, comprising:
an electric motor drive system comprising a three-phase electric motor and an inverter, wherein the inverter comprises a first inverter switch and a second inverter switch;
a negative cable connected to a negative pole of an electric vehicle inlet, the first inverter switch, and a negative pole of a battery;
a booster charging cable connected to a star-point of the three-phase electric motor and to a positive pole of the electric vehicle inlet, wherein the booster charging cable is not connected to the second inverter switch; and
a positive cable connected to the positive pole of the electric vehicle inlet, the second inverter switch, and a positive pole of the battery, wherein the positive cable is not connected to the star-point of the three-phase electric motor,
wherein a first breaker is in line with the negative cable, wherein the first breaker when open is configured to disconnect the negative pole of the electric vehicle inlet from the first inverter switch and the negative pole of a battery,
wherein a second breaker comprising a high voltage charging breaker is in line with the positive cable, wherein the second breaker when open is configured to disconnect the positive pole of the electric vehicle inlet from the second inverter switch and the positive pole of the battery,
wherein a third breaker comprising a charging station voltage charging breaker is on the booster charging cable between the positive pole of the electric vehicle inlet and the star-point of the three-phase electric motor, wherein the third breaker when open is configured to disconnect the positive pole of the electric vehicle inlet from the star-point of the three-phase electric motor, and
wherein the booster charging cable bypasses the positive cable based on respective settings of the first breaker, the second breaker, and the third breaker in response to the electric vehicle inlet being supplied an input voltage that is lower than a voltage of the battery.

2. The electric vehicle charging system of claim 1, wherein a fourth breaker is in line with the negative cable, and wherein the fourth breaker when open is configured to disconnect the negative pole of the battery from the negative pole of the electric vehicle inlet and the first inverter switch.

3. The electric vehicle charging system of claim 2, wherein the input voltage comprises 500 volts, and wherein the battery comprises an 800 volt battery.

4. The electric vehicle charging system of claim 1, wherein the electric vehicle charging system is configured to charge the battery by closing the first breaker, opening the second breaker, and closing the third breaker in response to the electric vehicle inlet being supplied the input voltage that is lower than the voltage of the battery.

5. The electric vehicle charging system of claim 1, wherein the first breaker, the second breaker, and the third breaker are opened during driving of a vehicle comprising the electric vehicle charging system.

6. The electric vehicle charging system of claim 1, further comprising a filter capacitor connected between the first breaker and the second breaker.

7. The electric vehicle charging system of claim 1, wherein the electric motor drive system comprises a filter capacitor and a breaker connected between the negative cable and the star-point of the three-phase electric motor.

8. The electric vehicle charging system of claim 1, wherein the electric motor drive system comprises an electromagnetic interference filter.

9. An electric vehicle, comprising:
an electric motor drive system comprising a three-phase electric motor and an inverter, wherein the inverter comprises a first inverter switch and a second inverter switch;
a negative cable connected to a negative pole of an electric vehicle inlet, the first inverter switch, and a negative pole of a battery;
a booster charging cable connected to a star-point of the three-phase electric motor and to a positive pole of the electric vehicle inlet, wherein the booster charging cable is not connected to the second inverter switch; and
a positive cable connected to the positive pole of the electric vehicle inlet, the second inverter switch, and a positive pole of the battery, wherein the positive cable is not connected to the star-point of the three-phase electric motor,
wherein a first breaker is in line with the negative cable, wherein the first breaker when open is configured to disconnect the negative pole of the electric vehicle inlet from the first inverter switch and the negative pole of a battery, wherein a second breaker comprising a high voltage charging breaker is in line with the positive cable, wherein the second breaker when open is configured to disconnect the positive pole of the electric vehicle inlet from the second inverter switch and the positive pole of the battery, wherein a third breaker comprising a charging station voltage charging breaker is on the booster charging cable between the positive pole of the electric vehicle inlet and the star-point of the three-phase electric motor, wherein the third breaker when open is configured to disconnect the positive pole of the electric vehicle inlet from the star-point of the three-phase electric motor, and wherein the booster charging cable bypasses the positive cable based on respective settings of the first breaker, the second breaker, and the third breaker in response to the electric vehicle inlet being supplied an input voltage that is lower than a voltage of the battery.

10. The electric vehicle of claim 9, wherein the first breaker, the second breaker, and the third breaker are opened during driving of the electric vehicle.

11. The electric vehicle of claim 9, wherein the electric vehicle charging system is configured to charge the battery by closing the first breaker, opening the second breaker, and closing the third breaker in response to the electric vehicle inlet being supplied the input voltage that is lower than the voltage of the battery.

12. The electric vehicle of claim 9, wherein the electric motor drive system comprises an electromagnetic interference filter.

13. The electric vehicle of claim 9, wherein a fourth breaker is in line with the negative cable, and wherein the fourth breaker when open is configured to disconnect the negative pole of the battery from the negative pole of the electric vehicle inlet and the first inverter switch.

14. The electric vehicle of claim 9, wherein the electric motor drive system comprises an 800 volt electric motor drive system.

15. A method, comprising:
determining, by a system comprising a processor, a maximum voltage of a battery of an electric vehicle and a voltage supplied to an inlet of the electric vehicle, wherein the electric vehicle comprises:
an electric motor drive system comprising a three-phase electric motor, a first inverter switch, and a second inverter switch;
a negative cable connected to a negative pole of an electric vehicle inlet, the first inverter switch, and a negative pole of the battery;
a booster charging cable connected to a star-point of the three-phase electric motor and to a positive pole of the electric vehicle inlet, wherein the booster charging cable is not connected to the second inverter switch; and
a positive cable connected to the positive pole of the electric vehicle inlet, the second inverter switch, and a positive pole of the battery, wherein the positive cable is not connected to the star-point of the three-phase electric motor; and
in response to a determination, by the system, that the maximum voltage of the battery is greater than the voltage supplied to the inlet of the electric vehicle:
closing, by the system, the first breaker that is in line with the negative cable;
opening, by the system, the second breaker in line with the positive cable; and
closing, by the system, the third breaker comprising a charging station voltage charging breaker, charging cable connected to the positive cable and a star point of a three phase electric wherein the booster charging cable bypasses the positive cable based on the maximum voltage of the battery being greater than the voltage supplied to the inlet of the electric vehicle.

16. The method of claim 15, wherein a filter capacitor is connected between the first breaker and the second breaker.

17. The method of claim 15, wherein the negative cable is further connected to the star-point of the three-phase electric motor.

18. The method of claim 17, wherein a filter capacitor and a fourth breaker are connected between the negative cable and the star-point of the three-phase electric motor.

19. The method of claim 15, wherein a fourth breaker is in line with the negative cable, and wherein the fourth breaker when open is configured to disconnect the negative pole of the battery from the negative pole of the electric vehicle inlet and the first inverter switch.

20. The method of claim 15, wherein the inlet is connected to a charging station, and wherein the charging station comprises a 500 volt charging station, and wherein the battery comprises an 800 volt battery.

* * * * *